(12) United States Patent
Murao et al.

(10) Patent No.: US 6,449,965 B1
(45) Date of Patent: Sep. 17, 2002

(54) VEHICLE AIR CONDITIONER

(75) Inventors: Kazushige Murao; Shigeyuki Hidaka; Masahiro Kawaguchi; Satoshi Koumura, all of Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/710,402

(22) Filed: Nov. 9, 2000

(30) Foreign Application Priority Data

Nov. 11, 1999 (JP) .......................................... 11-321476

(51) Int. Cl.$^7$ ............................ B60H 1/32; G05D 23/32
(52) U.S. Cl. .............................. 62/133; 62/158; 62/229; 62/323.4
(58) Field of Search ................................ 62/133, 228.3, 62/228.5, 323.4, 229, 158; 417/222.2

(56) References Cited

U.S. PATENT DOCUMENTS

| 4,480,443 A |   | 11/1984 | Nishi et al. ................... 62/227 |
| 4,537,042 A | * | 8/1985 | Nishi et al. ................ 62/227 X |
| 4,815,300 A | * | 3/1989 | Suzuki ...................... 62/227 X |
| 4,841,736 A |   | 6/1989 | Suzuki ........................ 62/133 |
| 4,864,832 A |   | 9/1989 | Suzuki ........................ 62/133 |
| 5,074,123 A |   | 12/1991 | Iida et al. ................... 62/228.5 |
| 5,145,326 A |   | 9/1992 | Kimura et al. ............ 417/222.2 |
| 5,529,461 A |   | 6/1996 | Kawaguchi et al. ..... 417/222.2 |
| 5,890,876 A |   | 4/1999 | Suito et al. .................. 417/213 |

FOREIGN PATENT DOCUMENTS

| JP | 63-090421 | 8/1988 | ............ B60H/1/32 |
| JP | 3-23385 | 1/1991 | |
| JP | 9-268973 | 10/1997 | |

* cited by examiner

*Primary Examiner*—William Wayner
(74) *Attorney, Agent, or Firm*—Morgan & Finnegan, LLP

(57) ABSTRACT

A vehicle air conditioner includes a variable displacement compressor forming a part of a coolant circuit, detectors for detecting external information necessary for air conditioning, and a controller. The compressor has pistons and mechanism for actuating the pistons to draw, compress and discharge refrigerant. The piston actuating mechanism is located in a crank chamber. The pressure in the crank chamber is changed to vary the compressor displacement. The controller controls the compressor based on the information from the detectors. When disengaging an electromagnetic clutch, which is located between a vehicle engine and the compressor, the controller quickly decreases the compressor displacement and prevents the pressure difference between the crank chamber and compression chambers excessively increased. Therefore, immediately after being stopped, the compressor is started at the minimum displacement, which minimizes the shock due to load torque change on the engine. Also, the electromagnetic clutch is prevented from malfunctioning.

15 Claims, 7 Drawing Sheets

VEHICLE AIR CONDITIONER

BACKGROUND OF THE INVENTION

The present invention relates to a vehicle air conditioner, and more particularly, to a vehicle air conditioner that includes a variable displacement compressor.

The compressor in such a vehicle air conditioner according to the publication has a swash plate and is shown in FIG. 6. A housing 101 of the compressor includes a front housing member, a center housing member and a rear housing member. A crank chamber 102 is defined in the front housing member. Cylinder bores 113 are defined in the center housing member. A suction chamber 114 and a discharge chamber 115 are defined in the rear housing member. A valve plate 117 is located between the center housing member and the rear housing member. A drive shaft 103 extends through the crank chamber 102 and is supported by the front housing member and the rear housing member.

The drive shaft 103 is coupled to an external drive source, which is a vehicle engine Eg, by an electromagnetic clutch 105. The clutch 105 is attached to the front end (left end as viewed in the drawing) of the housing 101. The clutch 105 includes a pulley 106 and an armature 107. The pulley 106 rotates relative to the housing. The armature 107 is fixed to the drive shaft 103 to rotate integrally therewith. An electromagnet 108 is located in the pulley 106. When the electromagnet 108 (the clutch 105 is on) is excited, the armature 107 is attracted to the electromagnet 108 and pressed against the pulley 106, which transmits the power of the engine Eg to the drive shaft 103. When the electromagnetic 108 is de-excited (the clutch 105 is off), the armature 107 is separated from the pulley 106, which disconnects the drive shaft 103 from the engine Eg.

A lug plate 109 is arranged to the drive shaft 103 in the crank chamber 102. The lug plate 109 is fixed to the drive shaft 103 to rotate integrally with the drive shaft 103. The swash plate 110 is supported on the drive shaft 103 and inclines relative to the axis L of the drive shaft 103. The swash plate 110 is coupled to the lug plate 109 by a hinge mechanism 111. A ring 112 is fitted about the drive shaft 103 to prevent the swash plate 110 from moving beyond the minimum inclination position. When contacting the ring 112, the swash plate 110 is at the minimum inclination position.

Several cylinder bores 113 are located about the drive shaft 103 in the center housing member. A piston 116 is reciprocally housed in each cylinder bore 113 and coupled to the swash plate 110. Rotation of the drive shaft 103 is converted into reciprocation of each piston 116 by the lug plate 109, the hinge mechanism 111 and the swash plate 110. As each piston 116 reciprocates, refrigerant gas is drawn to a compression chamber defined in the associated cylinder bore 113 through a corresponding suction valve, a number of which are formed in the valve plate 117 in correspondence with the bores 113. The refrigerant is then compressed and discharged to the discharge chamber 115 through a corresponding discharge valve, a number of which are formed in the valve plate 117 in correspondence with the bores 113.

A through hole is defined in the center housing member to receive an end of the drive shaft 103. A coil spring 118 is located in the through hole between the end of the drive shaft 103 and the valve plate 117. The spring 118 urges the drive shaft 103 leftward as viewed in FIG. 6 and compensates for dimensional errors of the parts, which prevents axial chattering in the compressor.

The crank chamber 102 is connected to the suction chamber 114 by a bleed passage 119. The discharge chamber 115 is connected to the crank chamber 102 by a supply passage 120. The supply passage 120 is regulated by an electromagnetic control valve 121. Specifically, the control valve 121 adjusts the opening size of the supply passage 120 to change the flow rate of highly pressurized refrigerant gas flowing from the discharge chamber 115 to the crank chamber 102. Since the flow rate of refrigerant flowing from the crank chamber 102 to the suction chamber 114 through the bleed passage 119 is lower than that of the refrigerant flowing through the supply passage 120, the difference between pressures acting on the front and rear ends of each piston 116, in other words, the difference between the pressure in the crank chamber 102 and the pressure in the compression chambers, is changed. Accordingly, the inclination angle of the swash plate 110 is changed, which changes the stroke of each piston 116. The displacement of the compressor is varied, accordingly.

A controller 131 includes a microprocessor and controls the electromagnetic clutch 105 and the control valve 121 based on external information. The information includes the passenger compartment temperature detected by a temperature sensor 132, the target temperature set by a temperature adjuster 133, which is manipulated by a passenger, and the ON/OFF state of an air-conditioner switch 134, which is manipulated by an passenger for starting and stopping the air conditioner.

FIG. 7 illustrates the control valve 121. The control valve 121 has a valve housing 126, a valve body 122, springs 125a, 125b and a solenoid coil 124. The valve housing 126 has a port 127, which is connected to the crank chamber 102 by a section of the supply passage 120, a valve chamber 128, which is connected to the discharge chamber 115 by another section of the supply passage 120, and a valve hole 120a, which connects the valve chamber 128 with the port 127. The valve body 122 opens and closes the valve hole 120a. The spring 125a extends between a wall of the valve chamber 128 and the valve body 122. The spring 125b, the force of which is weaker than that of the spring 125a, is located below the valve body 122.

When no current is supplied to the coil 124, the valve body 122 is moved downward by the force of the spring 125a, which completely shuts the supply passage 120. When a current is supplied to the coil 124, the valve body 122 is moved upward against the force of the spring 125a, which fully opens the supply passage 120.

When a passenger turns the switch 134 off, the controller 131 stops current to the electromagnet 108, which disengages the clutch 105. Accordingly, the compressor is stopped. At the same time, current to the coil 124 is stopped, which causes the control valve 121 to fully close the supply passage 120.

When the supply passage 120 is fully closed, the pressure in the crank chamber 102 is relatively low. Therefore, if the switch 134 is turned off in this state, the compressor is stopped with the swash plate 110 located at the maximum inclination position, which is shown by solid lines in FIG. 6. If the compressor is started immediately thereafter, the compressor starts operating with the maximum displacement, which requires the maximum load torque. This increases the load on the engine Eg. Accordingly, a great shock is produced.

SUMMARY OF THE INVENTION

Accordingly, it is an objective of the present invention to provide a vehicle air conditioner that produces no shock when a compressor is started immediately after it is stopped.

To achieve the foregoing and other objectives, the present invention provides an air conditioner for a vehicle having a variable displacement compressor and a controller. The compressor is selectively engaged and disengaged with the power source by an electromagnetic clutch and has a crank chamber accommodating a cam plate. The inclination angle of the cam plate varies based on the pressure of the crank chamber. A piston is coupled to the cam plate to reciprocally move by a stroke based on the inclination angle of the cam plate to compress gas within a compression chamber and discharge the compressed gas to a discharge chamber. The controller controls the displacement of the compressor based on an output from a detector sensing external conditions related to air conditioning. The compressor includes a supply passage connecting the discharge chamber to the crank chamber and an electromagnetic valve, which includes a valve body, for mechanically adjusting the cross sectional area of the supply passage to vary the pressure in the crank chamber and an electric actuator for selectively opening and closing the valve body. The controller selectively engages and disengages the electromagnetic clutch with the compressor, according to the output of the detector, outputs electric current according to the displacement of the compressor, and stops the current within a predetermined time period when the electromagnetic clutch is disengaged.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
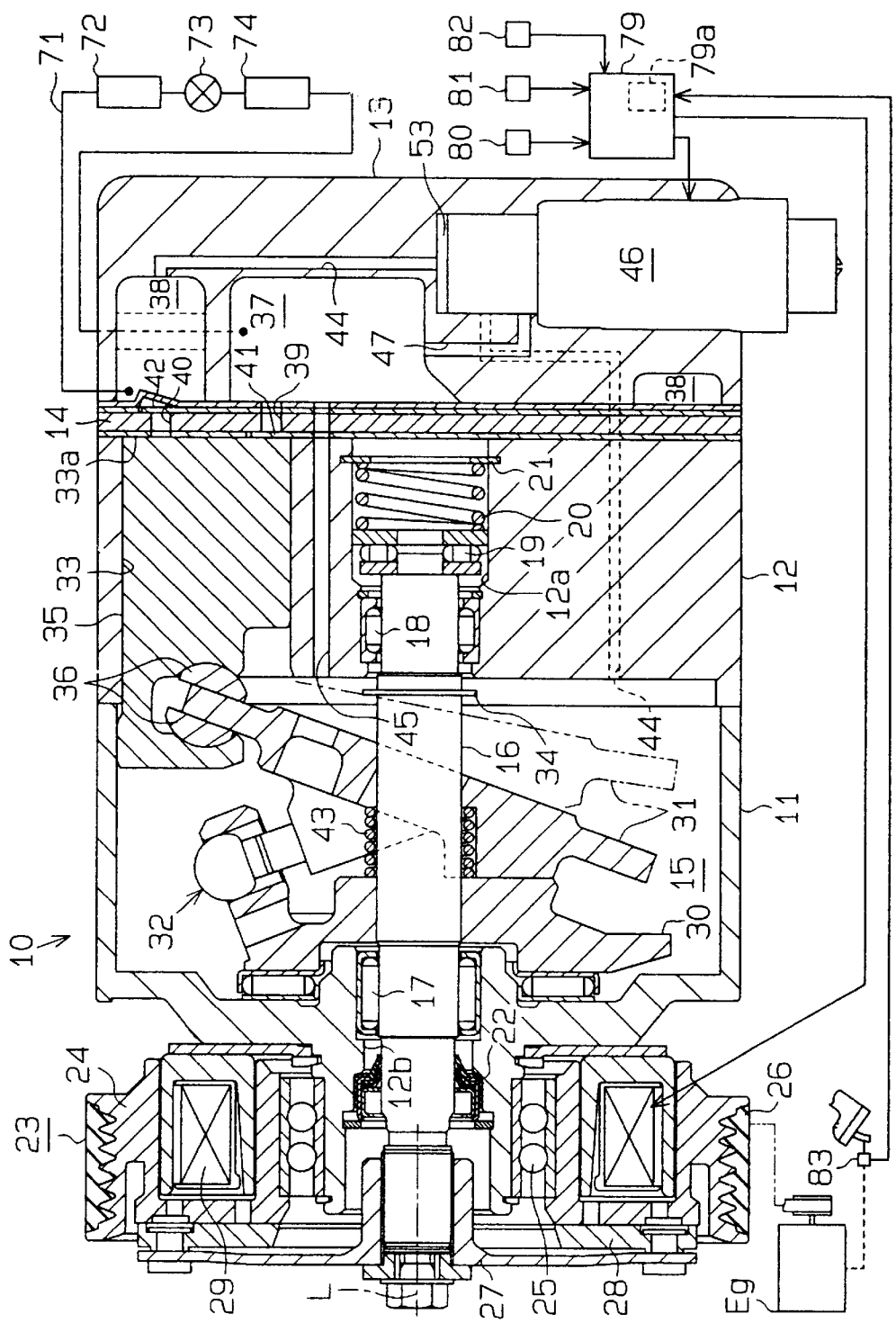
FIG. 1 is a cross-sectional view illustrating a compressor used in a vehicle air conditioner according to a first embodiment of the present invention.

As shown in FIG. 1, a vehicle air conditioner includes a refrigerant circuit 71 and a controller 79. The refrigerant circuit 71 has a compressor 10, a condenser 72, an expansion valve 73 and an evaporator 74. The compressor 10 is controlled by the controller 79.

In the circuit 71, refrigerant flows from the compressor 10, which is driven by an engine Eg to the evaporator 74 through the condenser 72 and the expansion valve 73. The refrigerant is then returned to the compressor 10. The evaporator 74 performs heat exchange between the refrigerant in the circuit 71 and air in the passenger compartment to vaporize the refrigerant. Accordingly, the passenger compartment is cooled. The controller 79 includes a microprocessor and controls the ON/OFF state of the air conditioner. The controller 79 also controls the compressor 10 based on the acceleration state of the vehicle and the passenger compartment temperature. The operation of the compressor 10 will be described. In FIG. 1, the left end of the compressor 10 is defined as the front end, and the right end of the compressor 10 is defined as the rear end.

The compressor 10 is a swash plate type compressor and includes a front housing member 11, a center housing member 12 and a rear housing member 13. The front housing member 11 is secured to the front end face of the center housing member 12. The rear housing member 13 is secured to the rear end face of the center housing member 12. A valve plate 14 is located between the center housing member 12 and the rear housing member 13.

A crank chamber 15 is defined in the front housing member 11. Cylinder bores 33 are defined in the center housing member 12. A suction chamber 37 as a suction pressure zone and a discharge chamber 38 as a discharge pressure zone are defined in the rear housing member 13 to connect with the cylinder bores 33. The open end of the crank chamber 15 is closed by the center housing member 12.

A drive shaft 16 extends through the crank chamber 15 and is supported by bearings 17 and 18, 19 located in the front housing member 11 and a center housing member 12.

The drive shaft 16 is supported by a radial bearing 17, which is located in a through hole 12b formed in the front housing member 11, and radial bearing 18, which is located in a through hole 12a formed at the center in the center housing member 12. A seal 22 is fitted about a portion of the drive shaft 16 that protrudes from the radial bearing 17. The seal 22 and the rear housing member 13 seal the crank chamber 15. A thrust bearing 19 is located at the rear end of the drive shaft 16, which protrudes rearward from the radial bearing 18. A coil spring 20 is located between the thrust bearing 19 and a spring seat 21 to urge the drive shaft 16 forward. The thrust bearing 19 prevents the spring 20 from rotating with the drive shaft 16. The spring seat 21 is a snap ring and is fitted and fixed to the inner wall of the through hole 12a.

The clutch 23 is electromagnetic and is located between the engine Eg and the drive shaft 16. The clutch 23 includes a pulley 24, a hub 27 and an armature 28. The pulley 24 is supported by the front end of the front housing member 11 with an angular bearing 25. A belt 26 is wound around the pulley 24 to connect the engine Eg. The hub 27 is fixed to the front end of the drive shaft 16 and supports the armature 28. The armature 28 is located between the pulley 24 and the hub 27 and faces the pulley 24. The armature 28 is supported by elastic radial arms of the hub 27 at the outer periphery. An electromagnet coil 29 is housed in the pulley 24 to face the armature 28 and to surround the drive shaft 16.

When the engine starts and a current is supplied to the clutch electromagnet 29, an electromagnetic attraction force is generated between the armature 28 and the pulley 24. Accordingly, the armature 28 contacts the pulley 24 against the elastic force of the hub 27, which engages the clutch 23. When the clutch 23 is engaged, drive power from the engine Eg is transmitted to the drive shaft 16 thorough the belt 26 and the clutch 23 (shown in FIG. 1). When current to the clutch electromagnet 29 is stopped, the armature 28 is separated from the pulley 24 by the elastic force of the hub 27, which disengages the clutch 23. When the clutch 23 is disengaged, transmission of power from the engine Eg to the drive shaft 16 is disconnected (shown in FIG. 5).

The cylinder bores 33 (only one is shown FIG. 1) are arranged at equal angular intervals about the drive shaft 16. A single-headed piston 35 is housed in each cylinder bore 33.

A lug plate 30 is secured to the drive shaft 16 in the crank chamber 15. A thrust bearing is located between the lug plate 30 and a wall of the front housing member 11 that defines the crank chamber 15. A cam plate, which is a swash plate 31 in this embodiment, is supported by the drive shaft 16, slidably in the axial direction of the axis L of the drive shaft 16. As shown by solid lines and broken lines, the swash plate 31 is inclinable, and its inclination angle may be changed. The inclination angle refers to the angle defined by the swash plate 31 and a plane perpendicular to the axis L of the drive shaft 16. A hinge mechanism 32 includes arms formed on the lug plate 30 and corresponding guide pins extending from the swash plate 31. Each guide pin is fixed to the swash plate 31 and has a ball at the distal end. The ball of each guide pin is received by a guide hole formed in the corresponding arm seat. The swash plate 31 is rotate integrally with the drive shaft 16 and inclinable by the hinge mechanism which connects the swash plate 31 with the lug plate 30. The swash plate 31 is coupled to the pistons 35 by shoes 36. A compression chamber 33a is defined in each cylinder bore 33 by the associated piston 35. As the drive shaft 16 rotates, the swash plate 31 is rotated at an inclination angle, which is determined by the difference between the pressure in the crank chamber 15 and the compression chambers 33a. Rotation of the swash plate 31 is converted into reciprocation of each piston 35 in the associated cylinder bore 33.

A snap ring 34 is secured to the drive shaft 16 between the swash plate 31 and the center housing member 12. The snap ring 34 prevents the swash plate 31 from moving beyond a minimum inclination position, which is shown by broken lines in FIG. 1. The maximum-inclination of the swash plate 31 is shown by solid lines. The swash plate 31 is located at the maximum inclination position when the swash plate 31 contacts the lug plate 30. A coil spring 43 is fitted about the drive shaft 16 between the lug plate 30 and the swash plate 31 to urge the swash plate 31 toward the minimum inclination position.

The suction chamber 37 is located in the center of the rear housing member 13. Part of the suction chamber 37 overlaps the cylinder bores 33 when viewed in the axial direction. The discharge chamber 38 is an annular chamber located about the suction chamber 37. Part of the discharge chamber 38 overlaps the cylinder bores 33 when viewed in the axial direction. Suction ports 39, discharge ports 40, suction valve flaps 41 and discharge valve flaps 42 are formed in the valve plate 14. Each suction port 39 and the corresponding suction valve flap 41 are located between the corresponding cylinder bore 33 and the suction chamber 37. Each discharge port 40 and the corresponding discharge valve flap 42 are located between the corresponding cylinder bore 33 and the discharge chamber 38. When each piston 35 is moved from its top dead center to its bottom dead center (forward from the position of FIG. 1) by the swash plate 31, refrigerant gas in the suction chamber 37 is drawn into the compression chamber 33a through the corresponding suction port 39 while flexing the suction valve flap 41 to an open position. As the piston 35 is moved from its bottom dead center to its top center, the refrigerant gas is compressed to a predetermined pressure and is discharged to the discharge chamber 38 through the discharge port 40 while flexing the corresponding discharge valve flap 42 to an open position.

A bleed passage 45 is formed in the center housing member 12 to connect the crank chamber 15 continuously with the suction chamber 37. A supply passage 44 is formed in the center housing member 12 and the rear housing member 13 to connect the discharge chamber 38 with the crank chamber 15. control valve 46 is secured to the rear housing member 13 to regulate the supply passage 44. The discharge chamber 38 is connected to a valve chamber 53 defined in the upper portion of the control valve 46 by a port of the supply passage 44. The supply passage 44 upstream to the control valve 46 is connected to an internal chamber of the control valve 46. A pressure sensing passage 47 is formed in the rear housing member 13 to connect the control valve 46 with the suction chamber 37.

The control valve 46 regulates the flow rate of highly pressurized refrigerant flowing from the discharge chamber 38 to the crank chamber 15 through the supply passage 44 to vary the pressure in the crank chamber 5. Refrigerant gas flows from the crank chamber 15 to the suction chamber 37 through the bleed passage 45. The pressure in the crank chamber 15 is changed in accordance with the amount of the refrigerant supplied by the supply passage 44 and relieved by the bleed passage 45. Accordingly, the pressure difference between the front and rear sides of the pistons 35, that is, between the crank chamber 15 and the compression chambers 33a is changed, which changes the inclination angle of the swash plate 31. This changes the stroke of each piston 35. The displacement of the compressor 10 is therefore varied.

Figure 2:
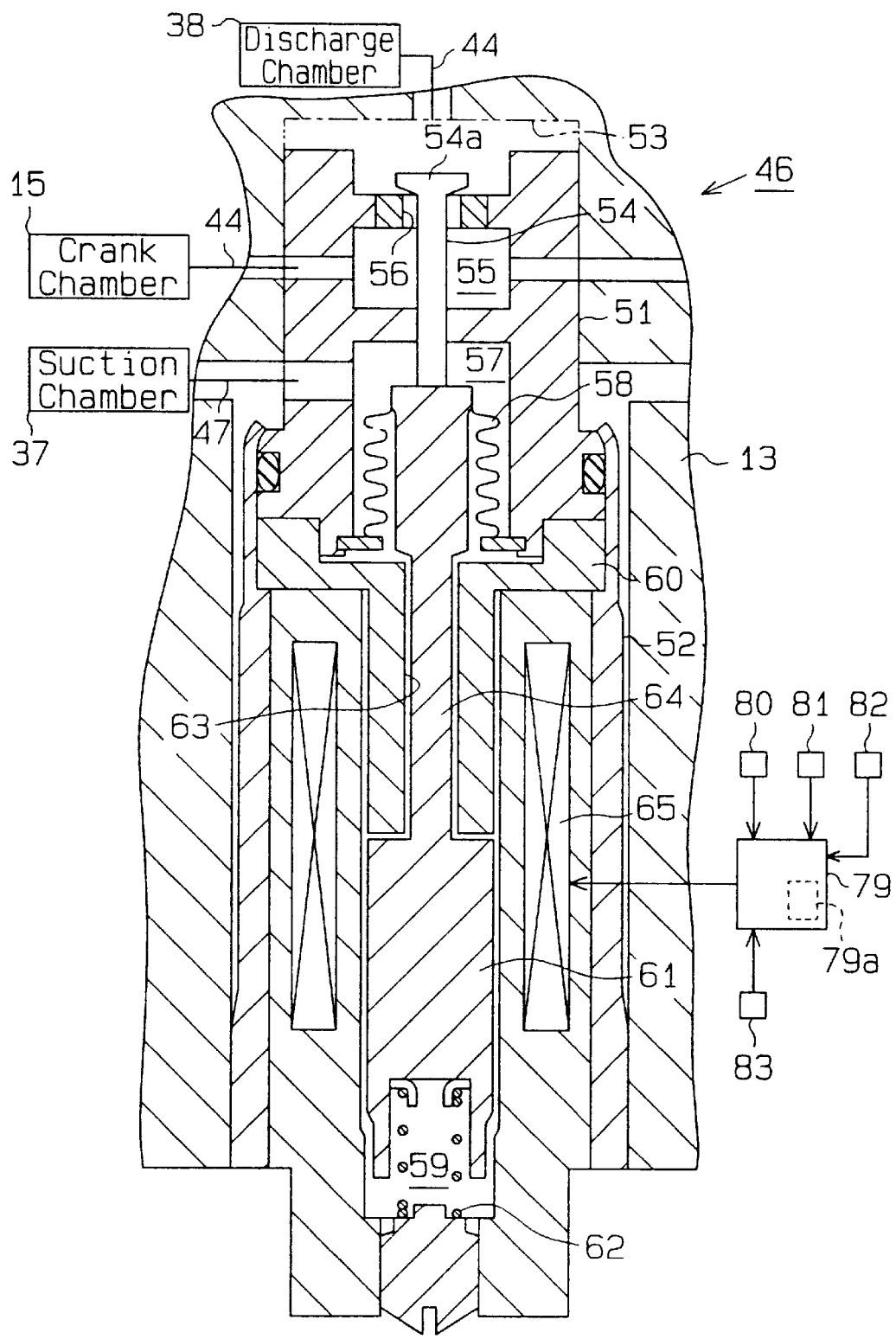
FIG. 2 is a cross-sectional view illustrating the control valve used in the compressor of FIG. 1.

FIG. 2 illustrates the control valve 46. The control valve 46 includes a valve portion in the upper side and an electric actuator in the lower side. The valve portion includes a cylindrical valve housing 51.

A recess, which defines part of a valve chamber 53, is formed by the upper end of the valve housing 51 and the rear housing 13. A communication chamber 55 is formed in the valve housing 51 and is located below the recess. The communication chamber 55 is connected to the crank chamber 15 by the supply passage 44. A valve hole 56 is formed in a wall that separates the valve chamber 53 from the communication chamber 55. A pressure sensing chamber 57 is formed in the valve housing 51 and is located below the communication chamber 55. The pressure sensing chamber 57 is always connected the suction chamber 37 by the pressure sensing passage 47. A valve body includes a valve 54a and a rod 54. The valve 54a is located in the recess defining the valve chamber 53. The rod 54 extends through the valve hole 56 with clearance, not to interrupt the refrigerant flow, and a wall separating the communication chamber 55 from the pressure sensing chamber 57. As the valve body is moved, the valve 54a changes the opening size of the valve hole 56, which changes the flow rate through the supply passage 44. The valve 54a opens and shuts the valve hole 56.

The valve chamber 53, the valve hole 56 and the communication chamber 55 in the control valve 46 form in part of the supply passage 44.

A bellows 58 is located in the pressure sensing chamber 57. The open end of the bellows 58 faces downward. An open end of the bellows 58 is attached to a valve seat located in the vicinity of the pressure sensing chamber 57. A part of the rod 54 that extends in the pressure sensing chamber 57 is attached to the bellows 58. The pressure sensing chamber 57 and the bellows 58 form a pressure sensing mechanism of the control valve 46.

The electric actuator includes an actuator housing 52. The housing 52 has two coaxial members. The housing 52 is fitted to the lower end of the valve housing 51. An O-ring forms a seal between the valve housing 51 and the actuator housing 52. The inside of the housing 52 is hollow. A stationary iron core 60 is located between the housings 51 and 52. The lower portion of the stationary core 60 extends through a cavity 59, which is formed in the inside of the housing 52. A movable iron core 61 is housed in the cavity 59. The movable core 61 includes a rod 64, which extends through a hole 63 formed in the stationary core 60 to communicate the pressure sensing chamber 57 and the cavity 59. The upper end of the rod 64 is connected to the bellows 58. The core rod 64 is connected to the rod 54. A coil spring 62 extends between the movable core 61 and a spring seat, which is threaded to the lower end of the cavity 59. The spring 62 urges the movable core 61 and the valve body, which includes the rod 54 and the valve 54a, upward to open the valve hole 56. A coil 65 is embedded inside of the housing 52 and surrounds the stationary core 60 and the movable core 61.

When no current is supplied to the coil 65, the valve 54a closes the valve hole 56. When a current is supplied to the coil 65, the movable core 61 and the valve body are moved in accordance with the magnitude of the current. When the pressure in the pressure sensing chamber 57 is changed, the axial dimension of the bellows 58 is changed, accordingly, which moves the movable core 61 and the valve body. Therefore, the opening size of the valve hole 56, or the opening size of the supply passage 44, is essentially determined by the force of the bellows 58 acting on the valve 54a, the rod 64 and the movable core 61, the attraction force generated between the stationary core 60 and the movable core 61, and the force of the spring 62.

As shown in FIGS. 1 and 2, the controller 79 is connected to a switch 80, an acceleration pedal sensor 83, a compartment temperature sensor 81 and a compartment temperature adjuster 82. The switch 80 is a main switch of the air conditioner. When turned on, the switch 80 outputs a signal for starting the air conditioner. When turned off, the switch 80 outputs a signal for stopping the air conditioner. The acceleration pedal sensor 83 detects the acceleration state of the vehicle. Specifically, the pedal sensor 83 detects the depression degree of the acceleration pedal and outputs a signal that represents the depression degree. The compartment temperature sensor 81 is located in the passenger compartment for directly detecting the compartment temperature. Alternatively, the temperature sensor 81 may be located at a place where the temperature represents the compartment temperature, for example, in the vicinity of the evaporator 74, to indirectly detect the compartment temperature. The temperature sensor 81 outputs an electrical signal indicating the detected temperature. The temperature adjuster 82 is manipulated by a passenger for setting a target temperature and outputs an electrical signal indicating the target temperature.

If the acceleration pedal depression degree detected by the pedal sensor 83 is less than a predetermined determination value and the compartment temperature detected by the temperature sensor 81 is higher than a target temperature set by the temperature adjuster 82, the controller 79 engages the clutch 23 to start the compressor 10. The controller 79 determines a target compressor displacement in accordance with the compartment temperature. Then, the controller 79 actuates the control valve 46 to change the compressor displacement for cooling the compartment temperature. When the compartment temperature is lower than the target temperature or when the vehicle is accelerating, the controller 79 disengages the clutch 23 and changes a process for supplying current to the control valve 46 such that the compressor displacement is minimized. The operation will be described with reference to FIGS. 3 and 4.

When a driver starts the engine Eg or when driver turns the ignition switch on, the controller 79 receives electricity from a vehicle battery. At this time, the clutch 23 is disengaged and the compressor 10 is not operating.

When supplied with electricity, the processor of the controller 79 executes initial settings according to an initial program in step S11. For example, the processor sets a value I(x) of current to the coil 65 in the control valve 46 to a zero I(0) and moves to step S12.

In step S12, the controller 79 judges whether the switch 80 is on. If the switch 80 is on, the controller 79 moves to step S13 and compares the depression degree ACC(x) of the pedal sensor 83 with a predetermined determination value ACC(set). If the pedal depression degree ACC(x) is equal to or greater than the determination value ACC(set), the controller 79 returns to step S12. The controller 79 repeats steps S12 and S13 until the pedal depression degree ACC(x) falls below the determination value ACC(set). If the pedal depression degree ACC(x) is less than the determination value ACC(set), the controller 79 moves to step S14 and compares a compartment temperature TH(x) and a target temperature TH(set). If the compartment temperature TH(x) is equal to or greater than the target temperature TH(set), the controller 79 moves to step S15.

In step S13, the controller 79 compares the pedal depression degree ACC(x) from the pedal sensor 83 with the predetermined determination value ACC(set) for judging whether the driver is depressing the acceleration pedal by a relatively great degree, that is, whether the vehicle will be quickly accelerated. If the vehicle is quickly accelerated, cooling of the passenger compartment will hinder the acceleration. Therefore, during rapid acceleration, the controller 79 does not start the compressor 10. If the vehicle is not quickly accelerated, the controller 79 permits the cooling of the compartment.

In step S14, the controller 79 compares the compartment temperature TH(x) of the compartment temperature sensor 81 with a target temperature TH(set) set by the temperature adjuster 82. If the compartment temperature TH(x) is less than the target temperature TH(set), the controller 79 returns to step S12. The controller 79 continues monitoring the ON/OFF state of the switch 80, the comparison between the pedal depression degree ACC(x) of the pedal sensor 83 and the comparison between the compartment temperature TH(x) of the compartment temperature sensor 81 and the target temperature TH(set) set by the temperature adjuster 82 until the compartment temperature TH(x) exceeds the target temperature TH(set) or until a passenger lowers the target temperature TH(set) below the compartment temperature TH(x).

If the compartment temperature TH(x) is higher than the target temperature TH(set), the controller 79 moves to step S15 and supplies electricity to the clutch electromagnet 29, which functions as a clutch coil. Accordingly, the clutch 23 is engaged, which starts the compressor 10.

After starting the supply of current to the clutch electromagnet 29, the controller 79 moves to step S16 and executes a normal control procedure. Specifically, the controller 79 determines the value I(x) of the current supplied to the control valve 46 based on the compartment temperature TH(x) of the compartment temperature sensor 81 and the target temperature TH(set) set by the temperature adjuster 82. The controller 79 then supplies a current having the value I(x) to the coil 65.

For example, the controller 79 decreases the value I(x) of the current to the control valve coil 65 as the difference between the compartment temperature TH(x) and the target temperature TH(set) increases, that is, as the demand for cooling by the passengers increases. Accordingly, the displacement of the compressor 10 is adjusted such that the suction pressure is maintained at a lower level. When the current value I(x) to the coil 65 is decreased, the attraction force between the stationary core 60 and the movable core 61 is decreased, which changes the position of the valve 54a. Accordingly, the target suction pressure of the control valve 46 is changed. The bellows 58 moves the valve body (54a, 54, 64) to adjust the opening size of the valve hole 56 such that the target suction pressure is maintained.

When the attraction force between the stationary core 60 and the movable core 61 is weakened, the valve 54a is moved to decrease the opening size of the valve hole 56.

As the opening size of the valve hole 56 is decreased, the flow rate of refrigerant gas supplied to the crank chamber 15 from the discharge chamber 38 is decreased. Since refrigerant gas constantly flows from the crank chamber 15 to the suction chamber 37 through the bleed passage 45, the pressure in the crank chamber 15 is gradually lowered. Thus, the difference between the pressure in the crank chamber 15 and the compression chambers 33a is decreased, which increases the inclination angle of the swash plate 31. The compressor displacement is increased accordingly. As a result, the air conditioner cools the passenger compartment to satisfy the cooling demand of the passengers.

For a smaller difference between the compartment temperature TH(x) and the target temperature TH(set), that is, for a smaller demand for cooling by passengers, the controller 79 increases the current value I(x) to the coil 65 of the control valve 46 to change the compressor displacement such that the suction pressure is maintained relatively high.

As the current value I(x) is increased, the attraction force between the stationary core 60 and the movable core 61 is increased. The valve 54a is moved accordingly to set the target suction pressure of the control valve 46 to a higher level. The bellows 58 moves the valve body (54a, 54, 64) to maintain the suction pressure at the increased target suction pressure and adjusts the opening size of the valve hole 56.

As the opening size of the valve hole 56 is increased, the flow rate of refrigerant supplied to the crank chamber 15 from the discharge chamber 38 is increased. Since the flow rate of refrigerant through the bleed passage 45 is less than that of the supply passage 44, the pressure in the crank chamber 15 gradually increases. The pressure difference between the crank chamber 15 and the compression chambers 33a is increased, which decreases the inclination angle of the swash plate 31. The stroke of each piston 35 is decreased and the compressor displacement is decreased, accordingly. The compartment temperature is adjusted to a value that satisfies the demand for cooling.

After supplying current of the value I(x) to the coil 65, the controller 79 moves to step S17. In step S17, the controller 79 compares the temperature TH(x) detected by the temperature sensor 81 and the target temperature TH(set) of the temperature adjuster 82. If the temperature TH(x) is equal to or higher than the target temperature TH(set), the controller 79 moves to step S18. If the pedal depression degree ACC(x) detected by the pedal sensor 83 is equal to or less than the determination value ACC(set) in step S18, the controller 79 moves to step S19. If the switch 80 is on in step S19, the controller 79 moves back to step S16. The controller 79 then repeats steps S16 to S18. That is, the controller 79 determines the current value I(x) to the control valve 46 in step S16, compares the current temperature TH(x) with the target temperature TH(set) in step S17 and compares the current pedal depression degree ACC(x) with the determination value ACC(set) in step S18. The controller 79 stops supplying current to the clutch electromagnet 29 if the temperature TH(x) is lower than the target temperature TH(set) in step S17, if the depression degree ACC(x) is equal to or greater than the determination value ACC(set) in step S18 or if the switch 80 is off in step S19. That is, the controller 79 stops the current to the clutch electromagnet 29 is the outcome of one of steps S17 to S19 is positive. Accordingly, the clutch 23 is switched from an engaging state to a disengaging state, which stops the compressor 10.

In this manner, if the vehicle is quickly accelerated before starting the compressor 10, the clutch 23 remains disengaged to reduce the engine load. Also, if the vehicle is quickly accelerated after the compressor 10 is started, the clutch is 23 disengaged to reduce the engine load. The present invention therefore does not hinder the acceleration performance of the vehicle.

When disengaging the clutch 23, the controller 79 monitors the operating state of the compressor 10 based on the current value to the coil 65. The controller 79 controls the control valve 46 based on the monitoring results such that the swash plate 31 is at the minimum inclination position when the compressor 10 is stopped. When the compressor 10 is started again, the displacement of the compressor is minimized, which minimizes the torque. The shock caused by starting the compressor 10 is thus reduced.

Figure 4:
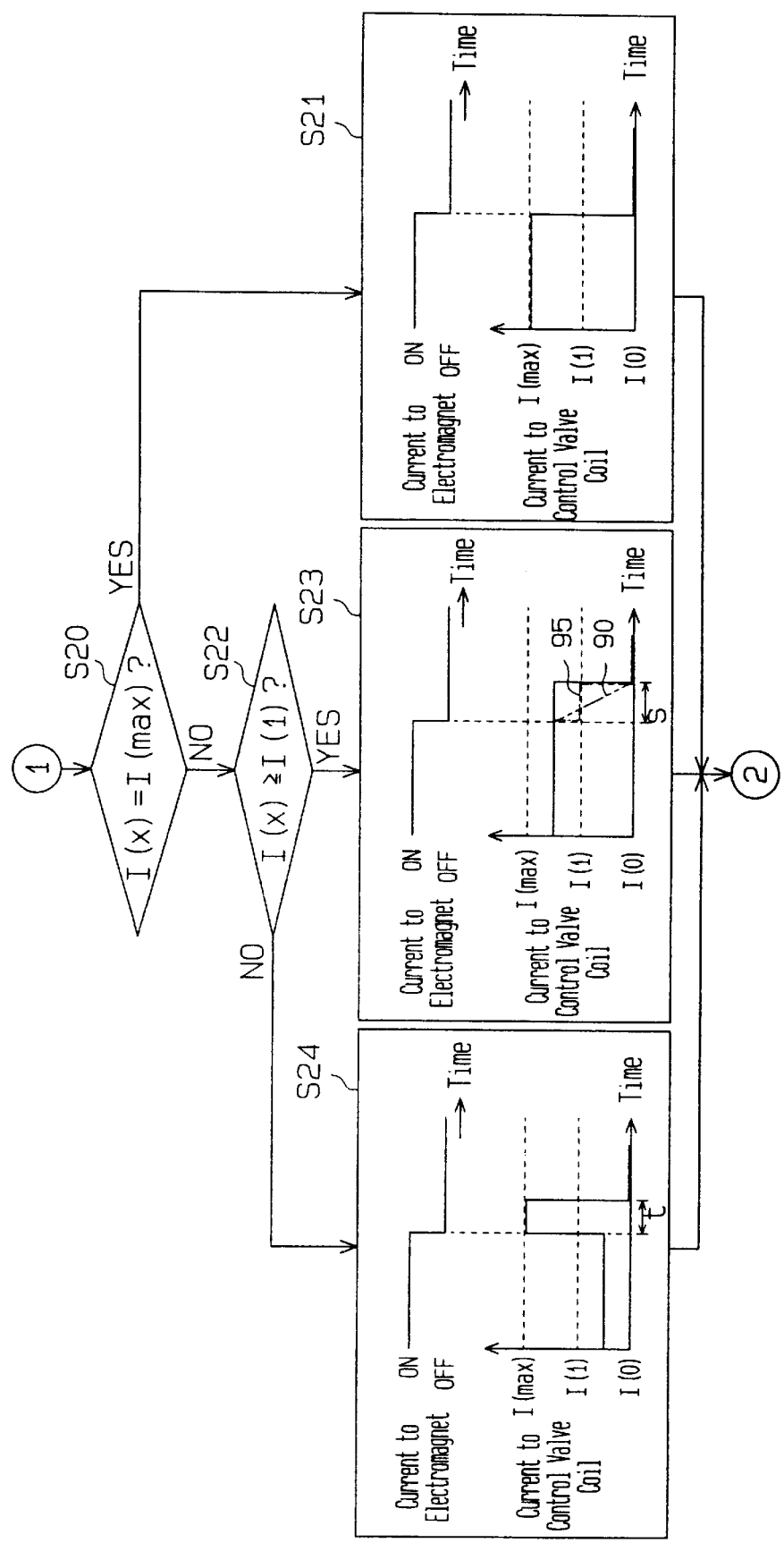
FIG. 4 is a flowchart showing the remainder of the routine shown in FIG. 3, a second embodiment and a third embodiment.

If the temperature TH(x) is lower than the target temperature TH(set), if the depression degree ACC(x) is greater than the determination value ACC(set) or if the switch 80 is off in steps S17 to S20, the controller 79 moves to step S20, which is shown in FIG. 4.

In step S20, the controller 79 compares the current value I(x) to the valve coil 65 with a predetermined maximum value I(max). If the current value I(x) is equal to the maximum value I(max), the controller 79 moves to step S21 and controls the current value I(x) in the manner shown in the box of step S21. The maximum value I(max) corresponds to a state in which the compressor 10 operates at or in the vicinity of the minimum displacement and with the highest suction pressure. In step S21, the controller 79 disengages the clutch 23 and instantly drops the current value to the coil 65 from the maximum value I(max) to zero I(0). Thus, after the clutch 23 is disengaged, the control valve 46 causes the compressor 10 to maintain the lowest suction pressure. The actual suction pressure does not fall below the lowest suction pressure. Therefore, the supply passage 44 is fully closed.

When the supply passage 44 is fully closed, highly pressurized refrigerant gas is not supplied to the crank chamber 15 from the discharge chamber 38, which lowers the pressure in the crank chamber 15. The crank chamber pressure immediately after the clutch 23 is disengaged is significantly high, and the pressure in each compression chamber 33a is lowered when the compressor 10 is stopped. Therefore, the difference between the pressure in the crank chamber 15 and the pressure in the compression chambers 33a is increased. This decreases the inclination angle of the wash plate 31 compared to that before the clutch 23 is disengaged. Thus, after the controller 79 changes the current value I(x) to zero I(0), the swash plate 31 is maintained at the minimum inclination position. After a certain period has elapsed since the clutch 23 is disengaged, the pressures in the compressor 10 are equalized and the difference between the crank chamber pressure and the compression chamber pressure is almost eliminated. However, the swash plate 31 is maintained at the minimum inclination position by the force of the spring 43.

Figure 3:
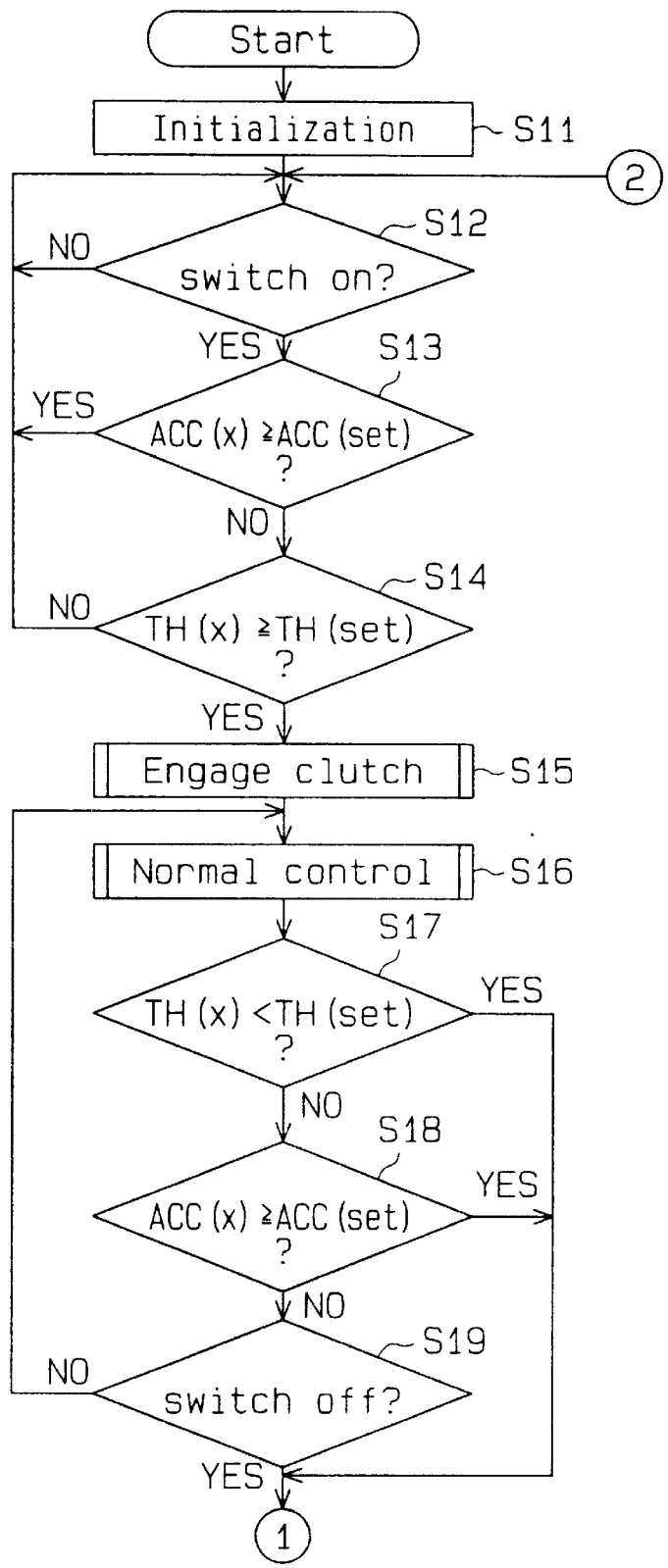
FIG. 3 is a flowchart showing a part of a routine executed by the controller of the air conditioner shown in FIG. 1.

When the currents to the clutch electromagnet 29 and the coil 65 are stopped, the controller 79 moves back to step S12 of FIG. 3. In step S12, the controller 79 monitors the ON/OFF state of the switch 80. If the switch 80 is ON, the controller 79 moves to step S13 and monitors the depression degree ACC(x) of the acceleration pedal. If the driver does not intend to accelerate the vehicle in step S13, the controller 79 moves to step S14 and compares the compartment temperature TH(x) with the target temperature TH(set). If the compartment temperature TH(x) is equal to or higher than the target temperature TH(set), the controller 79 moves to step S15 and engages the clutch 23 to start the compressor 10. If the driver intends to accelerate the vehicle in step S13 or if the temperature TH(x) is lower than the target temperature TH(set) in step S14, the controller 79 moves back to step S12. In this manner, when the compressor 10 is stopped, the swash plate 31 is at the minimum inclination position. Thus, when the compressor 10 is started again, the displacement of the compressor 10 is minimized, which minimizes the torque. The shock caused by starting the compressor is thus reduced.

If the current value I(x) to the coil 65 is not the maximum value I(max) in step S20, that is, if the current value I(x) is less than the maximum value I(max) in step S20, the controller 79 moves to step S22. In step S22, the controller 79 compares the current value I(x) with a predetermined reference value I(1). The reference value I(1) is: used for judging whether the compressor 10 is operating at an intermediate displacement and maintaining an intermediate suction pressure. If the current value I(x) satisfies the following inequality:

$$I(1) \leq I(x) < I(\max)$$

the controller 79 moves to step S23. In step S23, the controller 79 stops the current to the clutch electromagnet 29 and starts a timer 79a. The controller 79 maintains the current value I(x) in a range shown by the equality I(1)≦I(x)<I(max) for a predetermined period s. Therefore, the crank pressure is maintained at a relatively higher pressure.

When the clutch 23 is disengaged, the pressures in the compression chambers 33a are substantially simultaneously lowered. The pressure difference between the crank chamber 15 and the compression chambers 33a is increased over the period s. The swash plate 31 thus decreases its inclination angle to the minimum inclination. The period s is a period from when the controller 79 detects the current value I(x) to the coil 65 until when the swash plate 31 is moved to the minimum inclination position and is, for example, one to three seconds.

When the timer 79a judges that the period s has elapsed, the controller 79 stops current to the control valve 46. The supply passage 44 is then fully opened, which lowers the pressure in the crank chamber 15. Since the pressures in the compression chambers 33a continue to fall, the pressure difference between the crank chamber 15 and the compression chambers 33a is not reduced.

Therefore, the swash plate 31 is maintained at the minimum inclination angle position after the period s. When a certain time has elapsed after the period s, the pressure in the compressor 10 is equalized and the pressure difference between the crank chamber 15 and the compression chambers 33a is substantially eliminated. However, the swash plate 31 is maintained at the minimum inclination angle position by the force of the spring 43.

After stopping the supply of current to the clutch electromagnet 29 and the control valve coil 65, the controller 79 returns to step S12 of FIG. 3. In step S12, the controller 79 monitors the ON/OFF state of the switch 80. If the switch 80 is on, the controller 79 moves to step S13 and monitors the depression degree ACC(x) of the acceleration pedal. If the driver does not intend to accelerate the vehicle in step S13, the controller 79 moves to step S14 and compares the compartment temperature TH(x) with the target temperature TH(set). If the compartment temperature TH(x) is equal to or higher than the target temperature TH(set), the controller 79 moves to step S15 and engages the clutch 23 to start the compressor 10. If the outcome of step S13 indicates that the driver intends to accelerate the vehicle or if the temperature TH(x) is lower than the target temperature TH(set) in step S14, the controller 79 moves back to step S12. As described above, the swash plate 31 is maintained at the minimum inclination angle position when the compressor 10 is stopped. When the compressor is started in step S15, the displacement of the compressor 10 is minimum, which requires minimum torque. The shock caused by starting the compressor 10 is thus reduced.

If the current value I(x) is in the range I(0)≦I(x)<I(1) in step S22, that is, if the target suction pressure is low and the displacement is near the maximum level, the controller 79 moves to step S24. In step S24, the controller 79 controls the current to the clutch electromagnet 29 according to the graph shown in the box of step S24. The controller 79 stops supplying current to the clutch electromagnet 29 and starts the timer 79a. Until a predetermined period t has elapsed, the controller 79 supplies current value I(x) to the control valve 46 at the maximum value I(max). This suddenly fully opens the supply passage 44, which was almost fully closed when the clutch 23 was disengaged. Accordingly, the crank pressure, which was relatively low, is suddenly increased. At the same time, the pressure in the compression chambers 33a is lowered due to the disengagement of the clutch 23. Thus, the pressure difference between the crank chamber 15 and the compression chambers 33a increased. The inclination angle of the swash plate 31 decreases over the period t to the minimum inclination. The period t is a period from when the controller 79 detects the current value I(x) to the coil 65 until when the swash plate 31 is moved to the minimum inclination position and is, for example, one to three seconds.

When the period t has elapsed, the controller 79 stops supplying current to the control valve 46, which fully closes the supply passage 44 and lowers the pressure in the crank chamber 15. At this time, the pressure in the compression chambers 33a continues to dropping. Therefore, the pressure difference between the crank chamber 15 and the compression chambers 33a is not reduced. Thus, after the period t, the swash plate 31 is maintained at the minimum inclination angle position. Thereafter, when a certain period has elapsed, the pressures in the compressor 10 are equalized and the difference between the crank chamber pressure and the compression chamber pressure is almost eliminated. However, the swash plate 31 is maintained at the minimum inclination position by the force of the spring 43.

After stopping the supply of current to the clutch electromagnet 29 and the control valve coil 65, the controller 79 moves to step S12. In step S12, the controller 79 monitors the ON/OFF state of the switch 80. If the switch 80 is ON, the controller 79 moves to step S13 and monitors the depression degree ACC(x) of the acceleration pedal. If there is no indication that the driver intends to accelerate the vehicle in step S13, the controller 79 moves to step S14 and compares the compartment temperature TH(x) with the target temperature TH(set). If the compartment temperature TH(x) is equal to or higher than the target temperature TH(set), the controller 79 moves to step S15 and engages the clutch 23 to start the compressor 10. If the outcome of step S13 indicates that the driver intends to accelerate the vehicle or if the temperature TH(x) is lower than the target temperature TH(set) in step S14, the controller 79 returns to step S12. As described above, the swash plate 31 is maintained at the minimum inclination angle position when the compressor 10 is stopped. When the compressor is started in step S15, the displacement of the compressor 10 is minimum, which requires minimum torque. The shock caused by starting the compressor 10 is thus reduced.

If the driver turns the ignition switch off, the controller 79 stops receiving current from the vehicle battery. Thus, the controller 79 stops controlling the compressor 10. Also, the engine Eg and the compressor 10 are stopped. When the driver turns the ignition switch on, the controller 79 starts the procedure from step S11.

The air conditioner has the following advantages.

(1) When the vehicle is rapidly accelerated or when the compartment temperature falls below a target temperature, the controller 79 disengaged the clutch 23. Also, the controller 79 changes the current value I(x) to the control valve coil 65 to zero I(0) in a period s or a period t to quickly minimize the inclination angle of the swash plate 31. Then, the controller 79 controls the control valve 46 to maintain the minimum inclination angle. Therefore, when the compressor is started immediately after it is stopped, the displacement of the compressor 10 is minimum, which requires minimum torque. The shock caused by starting the compressor 10 is thus reduced. The shock caused when the clutch 23 is re-engaged is also reduced.

(2) When disengaging the clutch 23, the controller 79 opens the supply passage 44 for the period s or the period t, which are required for the inclination angle of the swash plate 31 to be minimized. After the swash plate 31 is moved to the minimum inclination angle position, the controller 79 fully closes the supply passage 44 to prevent the pressure in the crank chamber 15 from increasing excessively. In other words, the pressure difference between the crank chamber 15 and the compression chambers 33a is not increased excessively. The pressure difference therefore is not increased greater than a value that is sufficient for maintaining the minimum inclination angle of the swash plate 31. The drive shaft 16 is not moved rearward against the force of the spring 20. Thus, the pulley 24 is reliably disconnected from the armature. This will be further described below.

Figure 5:
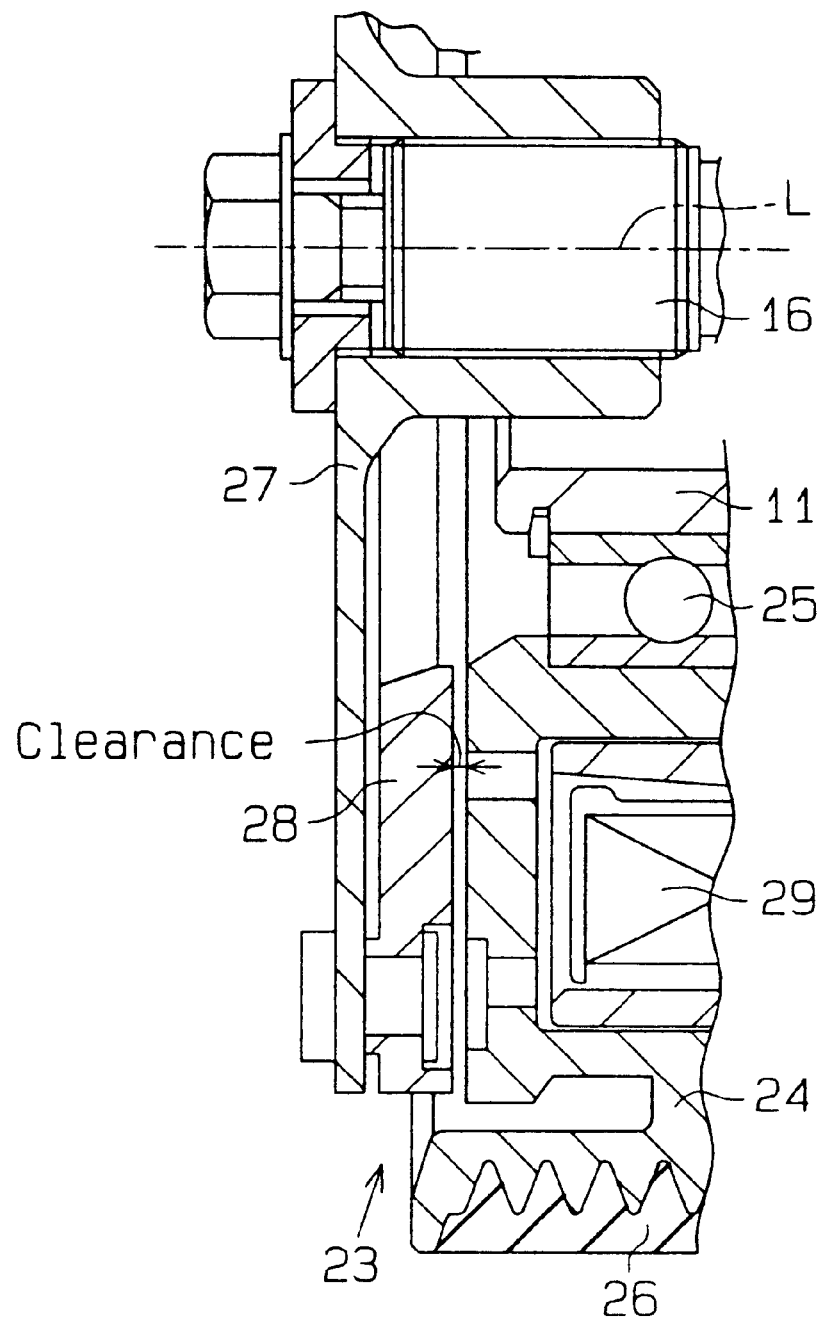
FIG. 5 is an enlarged partial cross-sectional view illustrating the electromagnetic clutch of the compressor shown in FIG. 1.
Figure 6:
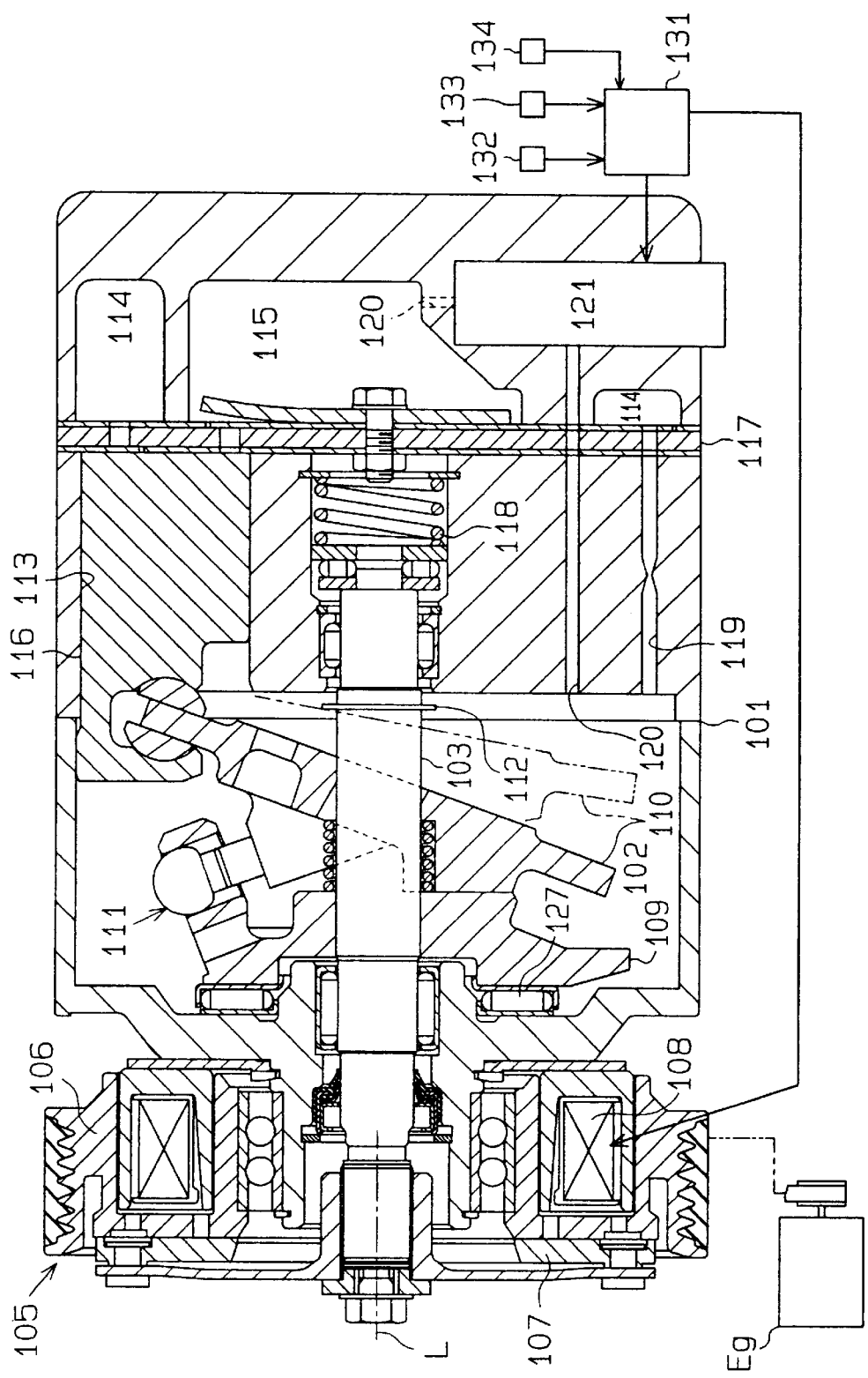
FIG. 6 is cross-sectional view illustrating a compressor used in a prior art vehicle air conditioner.

The armature 28 is pressed against the pulley 24 to transmit the power of the engine Eg to the drive shaft 16. When the armature 28 is separated from the pulley 24, the drive shaft 16 is disconnected from the engine Eg. FIG. 5 illustrates the disengaged state of the clutch 23. The clearance between the armature 28 and the pulley 24 is relatively small and is, for example, 0.5 mm.

Axial backward movement of the drive shaft 16 when the clutch 23 is disengaged causes the armature 28 to contact the rotating pulley 24 even if the clutch electromagnet 29 is de-excited. However, the above illustrated air conditioner prevents the drive shaft 16 from moving backward, which guarantees a minimum clearance between the pulley 24 and the armature 28. Thus, when the clutch 23 is not engaged, the pulley 24 does not contact the armature 28, which prevents noise and vibration.

(3) As in steps S24 and S25, when disengaging the clutch 23, the controller 79 decreases the current value I(x) to the control valve 46 to zero I(0) after the predetermined periods s or t, respectively. When the current value I(x) is the maximum value I(max), the controller 79 does not decrease the current value I(x). The reasons are follows. If the current value I(x) to the control valve coil 65 is the maximum value I(max) when the clutch 23 is disengaged, the pressure in the crank chamber 15 is predicted to be relatively high. Therefore, changing the current value I(x) to zero I(0) after disengaging the clutch 23 has no effect in reducing the impact of re-engaging (advantage (1)) and has the opposite effect of the advantage (2) since the pulley 24 contacts the armature 28 when the drive shaft 16 is moved backward. In the illustrated air conditioner, the time at which the current value I(x) is decreased to zero I(0) is advanced in accordance with the pressure in the crank chamber 15, which ensures the advantages (1) and (2).

(4) When disengaging the clutch 23, the controller 79 changes the current value I(x) to zero I(0) in one manner if the current value I(x) is less the maximum value I(max) and equal to or greater than the reference value I(1) and in another manner if the current value I(x) is less than the reference value I(1) and equal to or greater than zero I(0).

For example, if the current value I(x) is less than the maximum value I(max) and equal to or greater than the reference value I(1), the pressure in the crank chamber 15 is judged to be relatively high. Therefore, if the current value I(x) is increased for the period s, in other words, if the opening size of the supply passage 44 is increased, the pressure in the crank chamber 15 will be excessive for minimizing the compressor displacement, which does not prevent the drive shaft 16 from moving axially. In the illustrated air conditioner, the current value I(x) is maintained at a value for disengaging the clutch 23 over the period s. Accordingly, the difference between the crank chamber 15 and the compression chambers 33a minimizes the compressor displacement. The pressure difference is not increased excessively beyond a value sufficient to minimize the compressor displacement.

When the current value I(x) to the control valve 46 is less than the reference value I(1) and equal to or greater than zero I(0), the pressure in the crank chamber 15 is low. Therefore, maintaining the current value I(x) does not sufficiently increase the difference between the pressure in the crank chamber 15 and the pressure in the compression chambers 33a. The inclination angle of the swash plate 31 thus cannot be minimized. Thus, shock caused when the clutch 23 is re-engaged is not reduced. If a period during which the current value I(x) is maintained is extended, the pressure difference between the crank chamber 15 and the compression chambers 33a is increased. However, the extended period also represented a longer period for the compressor displacement to be minimized. If the compressor 10 is started before the displacement is minimized it causes shock. However, in the illustrated air-conditioner, the current value I(x) is increased to the maximum value I(max) to quickly and sufficiently increase the pressure difference between the crank chamber 15 and the compression chambers 33a. Accordingly, the swash plate 31 is quickly moved to the minimum inclination angle position.

As described above, when disengaging the clutch 23, the process for changing the current value I(x) to zero I(0) is changed in accordance with the current value I(x), in other words, with the pressure in the crank chamber 15. Therefore, when the clutch 23 is disengaged, the advantages (1) and (2) are achieved regardless of the pressure in the crank chamber 15. The advantages (1) and (2) are more effective with the advantage (3). In other words, shock caused by a change of the engine torque is minimized.

It should be apparent to those skilled in the art that the present invention may be embodied in many other specific forms without departing from the spirit or scope of the invention. Particularly, it should be understood that the invention may be embodied in the following forms.

In the above illustrated embodiment, when disengaging the clutch 23, the controller 79 supplies the current value I(x) at the maximum value I(max) for the period s if the current value I(x) is less than the maximum value I(max) and equal to or greater than the reference value I(1), or the inequality I(1)≦I(x)<I(max) is satisfied. However, in a second embodiment of the present invention, the current value I(x) may be continuously decreased over the period s shown by the alternate short and long dash line in step S23 of FIG. 4. Alternatively, in a third embodiment of the present invention, the current value I(x) may be discretely decreased to zero I(0). For example, as shown by the uniformly broken line in step S23 of FIG. 4, the current value I(x) may be temporarily maintained at the reference value I(1) and then decreased to zero I(0).

In the first embodiment, the periods s, t are constant regardless of the current value I(x) in steps S23 and S24. However, the period s, t may be changed in accordance with the current value I(x) at the time when the clutch 23 is disengaged in step S23 and S24.

I Specifically, when the inequality I(0)≦I(x)<I(l) or I(1)≦I(x)<I(max) is satisfied, the controller 79 may shorten the periods s and t for a greater current value I(x). This effectively prevents shock caused by re-engaging the clutch 23 and axial movement of the drive shaft 16.

In the first embodiment, the process for decreasing the current value I(x) to zero I(0) is changed in accordance with the current value I(x) when the clutch 23 is disengaged. However, the current value I(x) may be increased to the maximum value I(max) when the clutch 23 is disengaged regardless of the current value I(x). In this case, if the current value I(x) is not the maximum value I(max) (I(x)≠I(max)) in step S20, the controller 79 does not execute step S22 and moves to a step similar to step S24. In this step, the controller 79 adjusts the period t in accordance with the current value I(x) when the clutch 23 is disengaged. For example, the controller 79 sets the period t shorter for a greater current value I(x) when the clutch 23 is disengaged. Accordingly, a shock caused by starting the compressor 10 again is reduced and an axial movement of the drive shaft 16 is prevented.

In the illustrated embodiments, the controller 79 decreases the current value I(x) to zero I(0) over the periods s or t if the switch 80 is turned off, if the vehicle is accelerating or if the compartment temperature TH(x) is lower than the target temperature TH(set). However, depending on the purpose, the current I(x) may be decreased to zero I(0) only when the clutch 23 is disengaged, only when the vehicle starts accelerating or only when compartment temperature TH(x) is lower than the target temperature TH(set).

In the air conditioner of the illustrated embodiments, the depression degree ACC(x) of the acceleration pedal is detected by the acceleration pedal sensor 83. The controller 79 compares the depression degree ACC(x) with the determination value ACC(set). However, the controller 79 may compute an increase of the depression degree ACC(x) per unit time and compare the increased amount with a reference value. If the increased amount is equal to or greater than the reference value, the controller 79 judges that the acceleration pedal is being quickly depressed and the vehicle is being quickly accelerated.

The air conditioner of the illustrated embodiments may include a sensor for detecting the speed of the engine Eg. When the engine speed exceeds a predetermined reference value, the controller 79 disengages the clutch 23 and executes step S21 and steps S23 or S24 to control the current to the coil 65. The controller 79 stops the compressor 10 based on the engine load.

In the illustrated embodiments, the current to the coil 65 is controlled to be varied in an analog fashion. Alternatively, the current may be duty controlled, that is, the duty ratio of the current may be controlled for changing the attraction force between the stationary core 60 and the movable core 61.

Figure 7:
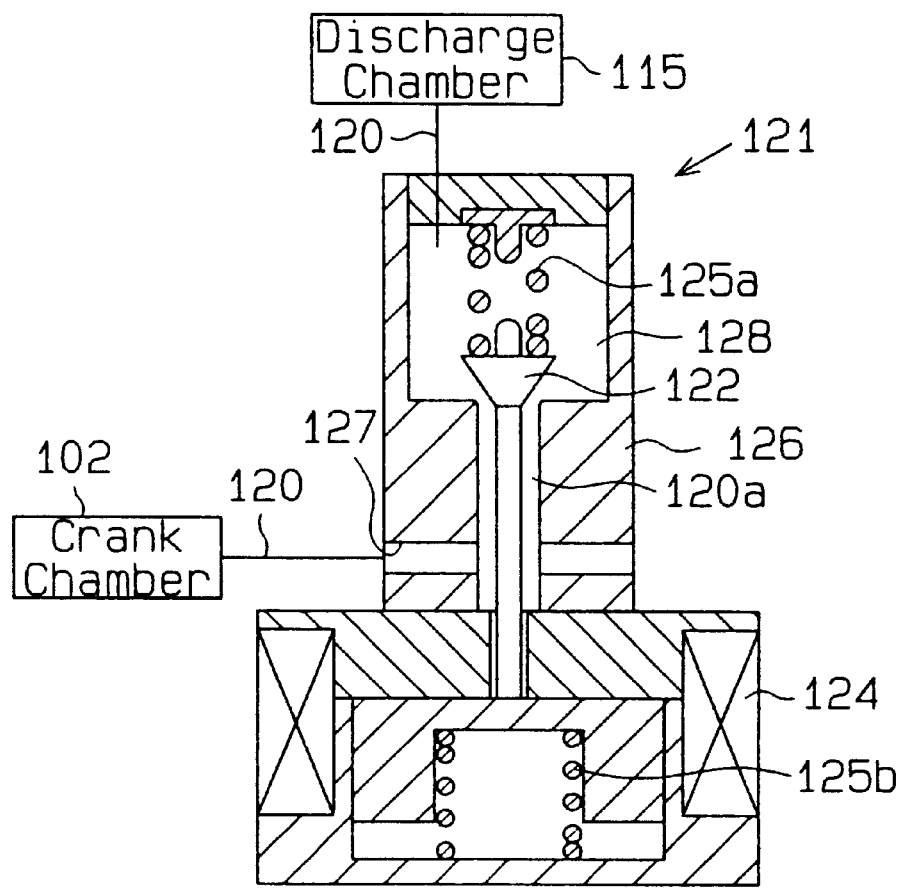
FIG. 7 is a cross-sectional view illustrating the control valve used in the compressor of FIG. 6.

In the illustrated embodiments, the control valve 46 moves the valve 54a using the valve portion and the electric actuator for changing the opening area of the valve hole 56, or the opening size of the supply passage 44. However, as in the prior art control valve shown in FIG. 7, the valve 54a may be actuated by a spring and an electric actuator.

In the illustrated embodiment, the control valve 46 adjusts the opening size of the supply passage 44. However, the control valve 46 may control the opening sizes of the supply passage 44 and the bleed passage 45 for controlling the displacement of the compressor 10.

The compressor 10 of the illustrated embodiments is a swash plate type. However, the present invention may be embodied in a wobble plate type compressor, in which the stroke of pistons is varied by controlling the pressure in a crank chamber.

Therefore, the present examples and embodiments are to be considered as illustrative and not restrictive and the invention is not to be limited to the details given herein, but may be modified within the scope and equivalence of the appended claims.

What is claimed is:

1. An air conditioner for a vehicle, the air conditioner having a variable displacement compressor and a controller, the compressor being selectively engaged and disengaged with the drive source by an electromagnetic clutch and having a crank chamber accommodating a cam plate, the inclination angle of which varies based on the pressure of the crank chamber, and a piston coupled to the cam plate to reciprocally move by a stroke based on the inclination angle of the cam plate to compress gas within a compression chamber and discharge the compressed gas to a discharge chamber, wherein the controller controls the displacement of the compressor based on an output from a detector sensing external conditions related to air conditioning, the compressor including:
a supply passage connecting the discharge chamber to the crank chamber and an electromagnetic valve, which includes a valve body, for mechanically adjusting the cross sectional area of the supply passage to vary the pressure in the crank chamber and an electric actuator for selectively opening and closing the valve body, wherein the controller selectively engages and disengages the electromagnetic clutch with the compressor according to the output of the detector, outputs electric current according to the output of the detector, and stops the current within a predetermined time period when the electromagnetic clutch is disengaged.

2. The air conditioner according to claim 1, wherein, when the electromagnetic clutch is disengaged, the controller stops the current to the electric actuator after the predetermined time period when the value of the current is less than a predetermined value.

3. The air conditioner according to claim 1, wherein the controller varies a pattern for stopping the current to the electric actuator based on the value of the current at the time the electromagnetic clutch is disengaged.

4. The air conditioner according to claim 1, wherein, in the predetermined time period, the controller supplies current to the electric actuator at the same value that was being supplied when the electromagnetic clutch was disengaged.

5. The air conditioner according to claim 1, wherein, in the predetermined time period, the controller supplies the current to the electric actuator at a value that is greater than the value that existed at the time the electromagnetic clutch is disengaged.

6. The air conditioner according to claim 1, further including a switch for turning the air conditioner on and off, wherein, if the electromagnetic clutch is engaged, the controller disengages the electromagnetic clutch when the switch is turned off.

7. The air conditioner according to claim 1, further including a compartment temperature sensor for detecting the temperature of the vehicle compartment and a temperature adjuster, which is controlled for setting a target compartment temperature, wherein the controller determines the value of the current to the electric actuator and engages and disengages the electromagnetic clutch based on the temperature detected by the compartment temperature sensor and a target temperature set by the temperature adjuster.

8. The air conditioner according to claim 1, further including a sensor for detecting an acceleration of the vehicle, wherein, when the electromagnetic clutch is engaged and the acceleration reaches a predetermined value, the controller disengages the electromagnetic clutch.

9. The air conditioner according to claim 1, wherein the electromagnetic valve includes a pressure sensing mechanism, which causes the valve body to open and close the supply passage in accordance with the pressure of a suction pressure zone of the compressor, and wherein the controller changes the target suction pressure, which is a reference pressure for actuating the pressure sensing mechanism, in accordance with the value of the current to the electric actuator.

10. An air conditioner for a vehicle, the air conditioner having a detector sensing external conditions related to air conditioning, a coolant circuit including a variable displacement compressor, an evaporator and an expansion valve, an electromagnetic clutch located between a vehicle engine and the compressor for selectively engaging and disengaging the compressor with the engine and a controller for controlling the displacement of the compressor, wherein the compressor includes a piston for compressing gas, a cam plate for driving the piston, a compression chamber and a crank chamber, which are located on opposite ends of the piston, wherein the pressure difference between the two chambers varies the displacement of the compressor, a discharge chamber and an electromagnetic valve, the electromagnetic valve being arranged to selectively connect and disconnect the discharge chamber with the crank chamber to change the pressure difference, wherein the controller engages the clutch to drive the compressor and actuates the electromagnetic valve based on the displacement of the compressor as determined in association with the temperature of a passenger compartment, and wherein the controller controls the electromagnetic clutch to disengage the engine from the compressor and changes a mode for controlling the valve based on the output of the detector when the temperature is lower than a predetermined value and the vehicle is in an acceleration state.

11. The air conditioner according to claim 10, wherein, when disengaging the electromagnetic clutch:
a) if the target suction pressure is the maximum and the compressor displacement is the minimum, the controller actuates the electromagnetic valve such that the pressure in the crank chamber is lowered at the same time the electromagnetic clutch is disengaged;
b) if the target suction pressure is lower than an intermediate level and the compressor displacement is the maximum, the controller actuates the electromagnetic valve such that the pressure of the crank chamber is increased and maintained for a first predetermined time period and is then lowered, and
c) if the target suction pressure is at the intermediate level and the displacement is at an intermediate level, the controller actuates the electromagnetic valve such that the pressure of the crank chamber is maintained for a second predetermined period and then lowered.

12. The air conditioner according to claim 10, wherein the electromagnetic valve includes a valve body for selectively opening and closing a passage connecting the compression chamber with the crank chamber and an electric actuator for actuating the valve body in accordance with the value of a signal supplied from the controller, wherein, when disengaging the electromagnetic clutch:
a) if the target suction pressure is the maximum and the compressor displacement is the minimum, the controller actuates the electric actuator such that the valve body closes the passage at the same time the clutch is disengaged;
b) if the target suction pressure is lower than an intermediate level and the displacement is the maximum, the controller actuates the electric actuator such that the valve body opens the passage in a first predetermined period and then closes the passage, and
c) if the target suction pressure is at the intermediate level and the displacement is at an intermediate level, the controller actuates the electric actuator such that the valve body increases the opening size of the passage and maintains the increased opening size for a second predetermined period and then closes the passage.

13. The air conditioner according to claim 12, wherein, when the suction pressure is at the intermediate level and the displacement is at the intermediate level, the controller actuates the electric actuator such that the valve body maintains the current opening size of the passage for the second predetermined period and then quickly closes the passage.

14. The air conditioner according to claim 12, wherein, when the suction pressure is at the intermediate level and the displacement is at the intermediate level, the controller actuates the electric actuator such that the valve body closes the passage by gradually and continuously decreasing the opening size of the passage in the second predetermined period.

15. The air conditioner according to claim 12, wherein, when the suction pressure is at the intermediate level and the displacement is at the intermediate level, the controller actuates the electric actuator such that the valve body closes the passage by discretely decreasing the opening size of the passage in the second predetermined period.

* * * * *

UNITED STATES PATENT AND TRADEMARK OFFICE
CERTIFICATE OF CORRECTION

PATENT NO. : 6,449,965 B1
DATED : September 17, 2002
INVENTOR(S) : Kazushige Murao et al.

It is certified that error appears in the above-identified patent and that said Letters Patent is hereby corrected as shown below:

Column 6,
Line 6, please add -- A -- in front of "control"

Column 15,
Line 29, please delete "I" in front of "Specifically".

Signed and Sealed this

Eleventh Day of March, 2003

JAMES E. ROGAN
*Director of the United States Patent and Trademark Office*